United States Patent [19]

Delmastro

[11] 4,428,513
[45] Jan. 31, 1984

[54] SPARE WHEEL CARRIER

[75] Inventor: John A. Delmastro, Romeo, Mich.

[73] Assignee: General Motors Corporation, Detroit, Mich.

[21] Appl. No.: 444,694

[22] Filed: Nov. 26, 1982

[51] Int. Cl.³ ............................................. B62D 43/04
[52] U.S. Cl. ............................... 224/42.21; 224/42.23; 248/201; 248/274; 248/286; 414/465; 414/466
[58] Field of Search .............. 224/42.12, 42.21, 42.23, 224/42.28, 42.44; 296/37.2; 414/462, 463, 464, 465, 466; 248/279, 286, 201, 274

[56] References Cited

U.S. PATENT DOCUMENTS

| 1,185,525 | 5/1916 | Morris | 224/274 X |
| 4,047,629 | 9/1977 | Klein | 224/42.21 X |
| 4,087,032 | 5/1978 | Miller et al. | 224/42.23 |
| 4,363,431 | 12/1982 | Muschalek | 224/42.21 X |

FOREIGN PATENT DOCUMENTS

| 988712 | 8/1951 | France | 414/466 |
| 1083830 | 1/1955 | France | 224/42.44 |
| 784718 | 10/1957 | United Kingdom | 224/42.23 |

Primary Examiner—Allan N. Shoap
Attorney, Agent, or Firm—Herbert Furman

[57] ABSTRACT

A spare wheel carrier includes a spare wheel support member mounting brackets adjacent one end thereof having L-shaped slots. Pivots mounted on the vehicle are engageable with the ends of either legs of the slots to locate the support member different distances from the floor of the vehicle so as to support different thickness spare wheels.

2 Claims, 7 Drawing Figures

SPARE WHEEL CARRIER

This invention relates generally to spare wheel carriers of the type which store a spare wheel under the floor pan of the vehicle and more particularly to such a carrier which will house various thickness spare wheels.

It is known to provide vehicles with spare wheel carriers which are located under the rear floor pan of the vehicle and which include a generally planar support having its forward end relative to the body pivoted to the rear floor pan for movement of the support between a raised generally horizontal storage position and a lowered generally angular position resting on the ground for removal and replacement of the spare wheel. The rearward end of the support is releasably attached to the floor pan in various known manners.

The spare wheel carrier of this invention is of this general type but is adjustable to store various thickness spare wheels, such as a normal thickness spare wheels, a racing or off-the-road spare wheel, or a so-called mini spare wheel.

In the preferred embodiment, a forward cross member of the rear floor pan is provided with a pair of spaced depending pivots. Mounted to the forward end of the support are a pair of spaced brackets, each of which is respective to a pivot and includes a generally vertically extending L-shaped closed slot receiving the pivot. When the pivots engage the upper ends of the longer legs of the slots, the support is spaced a maximum distance from the floor pan so as to house a maximum thickness spare wheel therebetween when the support is in the raised storage position. When the pivots engage the ends of the shorter legs of the slots, the support is spaced a minimum distance from the floor pan so as to house a minimum thickness spare wheel therebetween when the support is in the raised position. The support clamps the spare wheel between the forward cross member of the floor pan and a rearward cross member. Additional thickness spare wheels can be accommodated by providing brackets which span the longer legs of the slots so that the pivots rest on such brackets rather than on the upper ends of such longer legs. The rearward end of the support is maintained in the raised storage position by an extendable and retractable strut which is engageable with a bracket mounted to the rearward cross member of the floor pan. Release of the strut from the support permits the support to be lowered and rested on the ground so that the spare wheel can be removed or replaced.

One feature of this invention is that it provides an improved spare wheel carrier for vehicles which will house and store various thickness spare wheels underneath the vehicle. Another feature is that the carrier includes a spare wheel support having one end thereof pivotable to the vehicle about a selected one of a plurality of horizontal axes for movement about the selected axis between a raised generally horizontal storage position and a lowered angular position with the other end thereof resting on the ground for removal and replacement of the spare wheel. A further feature is that the one end of the support is provided with brackets having generally L-shaped closed slots which receive pivots depending from the vehicle, with the engagement of the pivots with the ends of the longer legs of the slots spacing the support a maximum distance below the vehicle in the raised position so that the support can store a maximum thickness spare wheel and be pivoted about a first axis between the raised and lowered positions, and with the engagement of the pivots with the ends of the shorter legs of the slots spacing the support a minimum distance below the vehicle to store a minimum thickness spare wheel and be pivoted about a second axis for movement between the raised and lowered positions. Yet another feature is that the length of the longer legs of the slots can be reduced by applied brackets, the engagement of the pivots with such brackets spacing the support an intermediate distance below the vehicle so as to store an intermediate thickness spare wheel and pivot the support to the floor pan for movement about a third axis between raised and lowered positions.

These and other features of the invention will be readily apparent from the following specification and drawings wherein.

Figure 1:
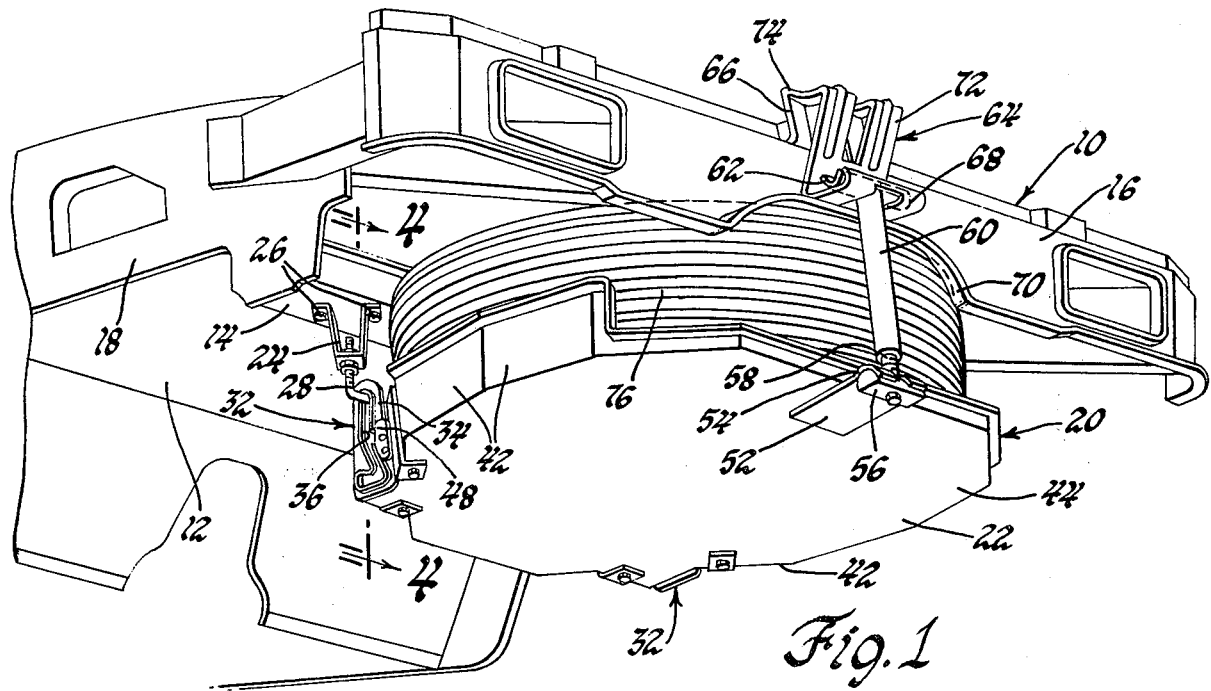
FIG. 1 is a partial view of the rear portion of a vehicle floor assembly embodying a spare wheel carrier according to this invention, with the support being shown in the raised storage position housing a maximum thickness spare wheel.

Referring now to FIG. 1 of the drawings, the rear portion of a vehicle floor assembly designated generally 10 includes a rear floor pan 12, a forward cross member 14 of generally hat shape section having the flanges thereof welded to floor pan 12, and a floor pan rear cross member 16 also welded to the floor pan 12. Members 14 and 16 are also secured to side frame members 18 which depend from securement from floor pan 12. The foregoing structure is conventional and forms no part of this invention.

A spare wheel carrier 20 according to this invention includes a dished support 22 of generally octangonal shape. A generally U-shaped bracket 24 is located inboard of each member 18 and has the legs thereof bolted at 26 to the cross member 14 to each side of the forward end or forward portion of the support 22. Only the left hand bracket 24 is shown but it will be understood that the right hand bracket is of the same construction. An L-shaped pivot 28 has a threaded longer leg adjustably attached by nuts to the base of each bracket 24. The shorter leg of the pivot terminates in an annular head 30 shown in FIG. 4. The shorter legs of the pivots 28 are aligned transversely of the vehicle and define a transverse horizontal pivot axis.

Figure 2:
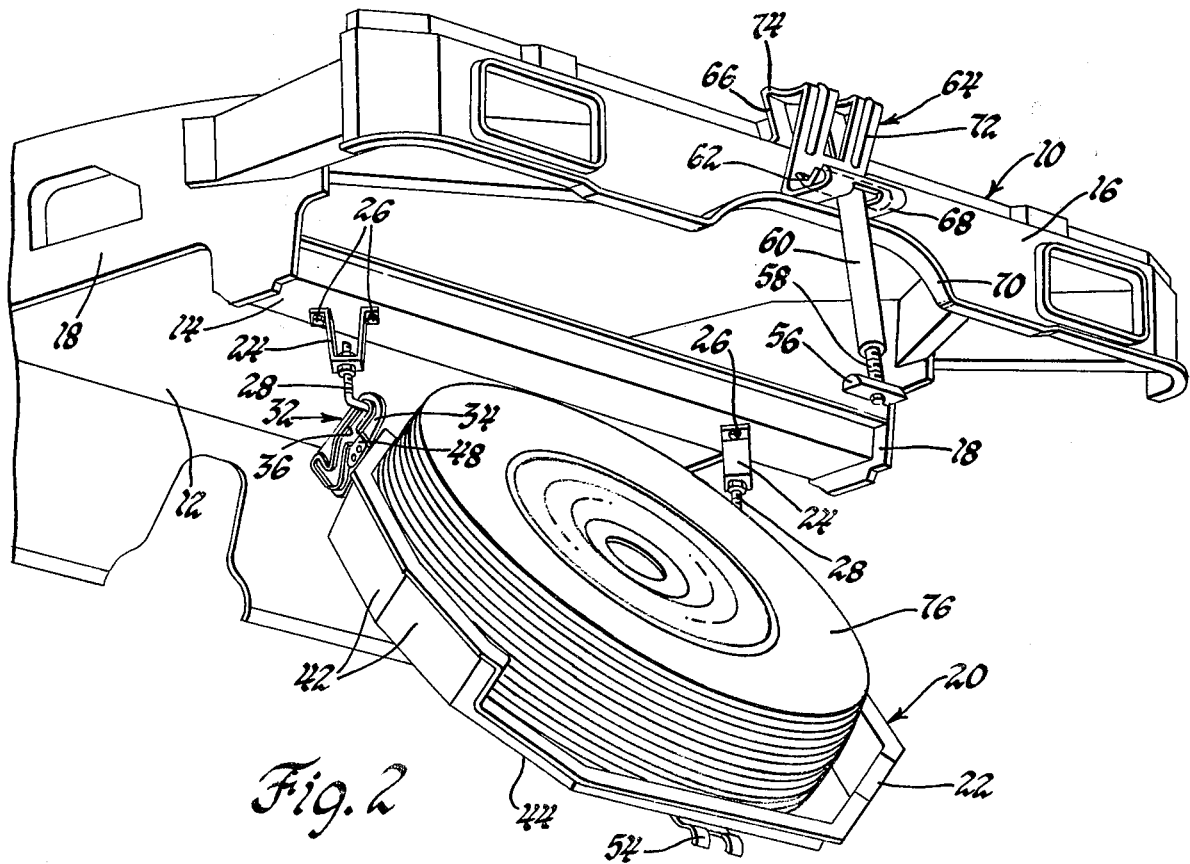
FIG. 2 is a view similar to FIG. 1 showing the support in the lowered position.
Figure 4:
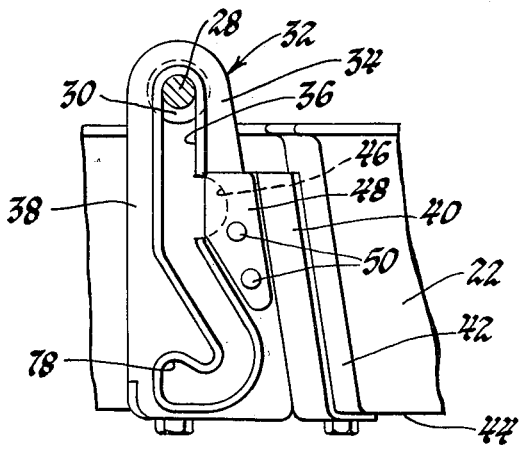
FIG. 4 is an enlarged view of a portion of FIG. 1.

As shown in FIGS. 1, 2 and 4, a bracket 32 is located to each side of the forward end of the support 22. Each bracket includes a base wall 34 having a slightly outwardly flanged closed slot 36 therein of generally L-shape. The base wall 34 includes partial angular lateral flanges 38 and 40 which are bolted or otherwise secured to adjacent angular side walls 42 and to the base wall 44 of the support 22 to locate walls 34 in spaced parallel vertical planes normal to the axis defined by pivots 28. The brackets 32 are of opposite hand. Each head 30 of a shorter leg of a pivot 28 engages the inner side of a base wall 34 of a respective bracket 32 to thereby pivotally mount the forward end of the support 22 to the cross member 14 as will be further described. A portion of wall 34 of the bracket 32 is cut away at 46 to permit entry of the heads 30 through slots 36 to mount support 22 to pivots 28. The slot 36 has a width approximately equal to that of the diameter of the shorter leg of the pivot 28. A bracket 48 is bolted at 50 to each wall 34 and covers the cut away 46 to prevent the heads 30 from disengaging from the brackets 32.

A bracket 52 is secured to the base wall 44 of support 22 adjacent the rearward end thereof and includes a bifurcated arcuate free end 54 which projects rearwardly of the support 22. A semi-cylindrical apertured lug 56 is rotatably engaged within the free end 54 of bracket 52 and a headed member 58 projects through the lug and between the legs of the end 54. The member 58 is threaded and is threadedly received within an internally threaded member 60 which includes a U-shaped lug 62 at its upper end. The members 58 and 60 and the lugs 56 and 62 provide an extendable and retractable strut releasably supporting the rearward end of the support 22 to the cross member 16 as will be further described.

A bracket 64 has an upper flanged terminal leg 66 secured to an upper flange of cross member 16 and a lower flanged terminal leg 68 thereof seating on and secured to an elongated arcuate flange 70 of a cut-out in the central portion of the cross member 16. The bracket 64 further includes a bifurcated ribbed leg 72 and a slightly arcuate bifurcated leg 74. The leg 68 of the bracket 64 defines a first step and the leg 74 defines a second step.

Referring now to FIG. 1, when a maximum size spare wheel 76 is to be stored, the support 22 is positioned with the upper ends of the longer legs of the slots 36 of brackets 32 in engagement with the pivots 28 as shown in FIGS. 1 and 4. This spaces the forward end of the support 22 the maximum distance from the cross members 14 and 16. The rearward end of the support is located by the engagement of the lug 62 of member 60 with the first step or leg 68 of the bracket 64 and the engagement of lug 56 with the end 54 of bracket 52. This engagement is assured by rotating member 58 to thread this member into member 60. This is done by means of a suitable wrench applied to the head of member 58. The support 22 is thus located horizontal to clamp the forward portion of the spare wheel 76 against the cross member 14 and to clamp the rearward portion of the spare wheel against the flange 70. Thus the spare wheel is held against rattling during normal operation of the vehicle.

If it is desired to use the spare wheel 76, a wrench is applied to the head of the member 58 and this member rotated to partially unthread this member from the member 60. The support 22 is then slightly lifted up, the lug 56 disengaged from the bifurcated end 54 of bracket 52 and the support 22 is then lowered until it rests on the ground, FIG. 2, so that the spare wheel 76 can be removed. A number of side walls 42 are cut away at the rearward end of the support to facilitate removal of the spare wheel. During the movement of the support 22 from the raised to the lowered position, it rotates about the transverse axis defined by the shorter legs of pivots 28. Once another spare wheel is placed on the support 22, the support is raised until the lug 56 can be slipped under the bifurcated end 54 of the bracket 52. A wrench is then applied to the head of member 58 to again thread this member into the member 60 until the lugs 56 and 62 again tightly engage end 54 of bracket 52 and leg 68.

Figure 3:
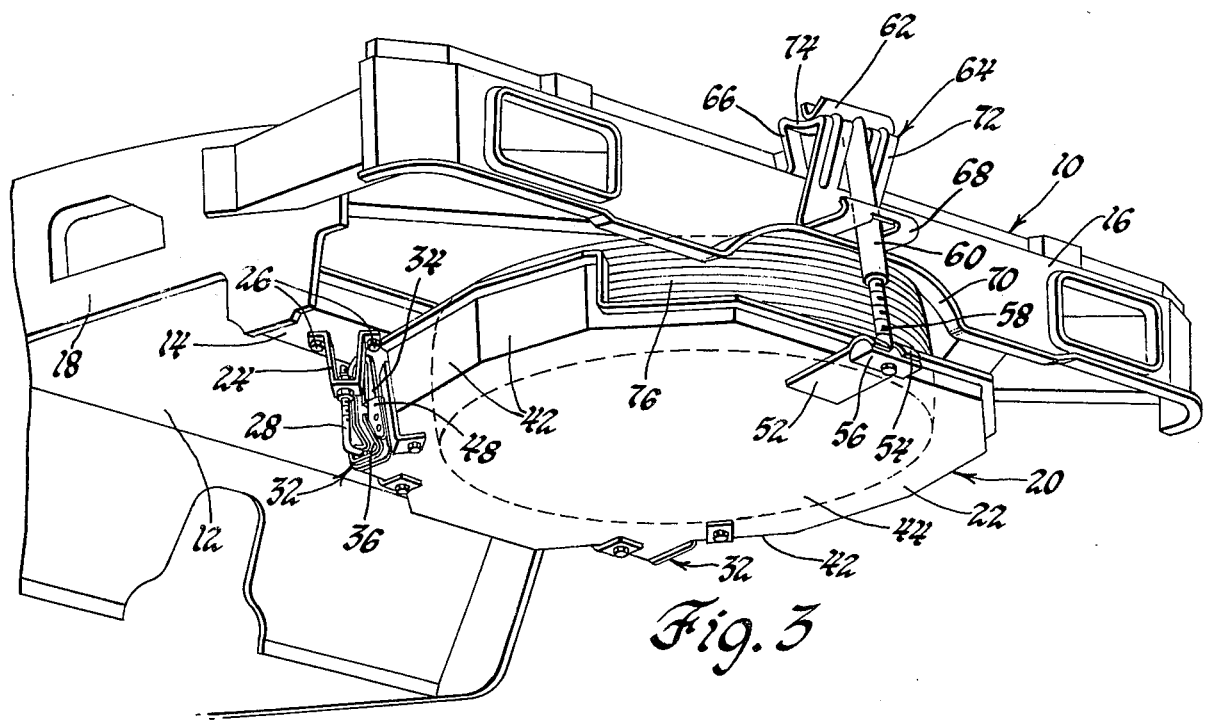
FIG. 3 is a view similar to FIG. 1 showing the support in a storage position housing a minimum thickness spare wheel.
Figure 5:
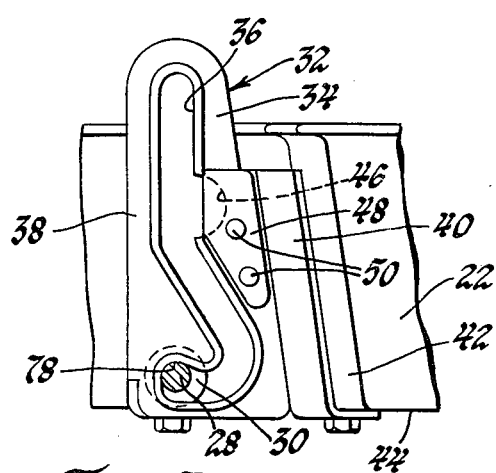
FIG. 5 is an enlarged view taken along line 3—3 of FIG. 3.

If a minimum thickness spare wheel 76, such as a mini spare, is to be stored, the support 22 is manually lifted, with no spare wheel thereon, to move the slots 36 relative to the pivots 28 until the pivots pass into the shorter legs of the slots 36 and respectively engage downwardly opening concavity 78 at the end of the shorter legs as shown in FIG. 5 to thereby space the forward end of the support 22 a minimum distance from the floor assembly 10. Thereafter the mini spare wheel can be placed on the support 22 in lowered position and the support moved between its raised and lowered positions as previously described. When the mini spare wheel is to be stored, the lug 62 can be shifted from the leg 68 to the leg 74 as shown in FIG. 3 to minimize the amount of threading and unthreading of the member 58 relative to the member 60 when the support 22 is to be moved between its raised and lowered positions. The lug 62 can, of course, remain engaged with the leg 68 if desired and the carrier will work equally as well.

Figure 7:
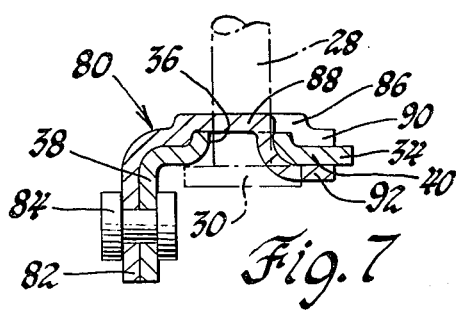
FIG. 7 is an enlarged sectional view taken generally along the plane indicated by line 7—7 of FIG. 6.
Figure 6:
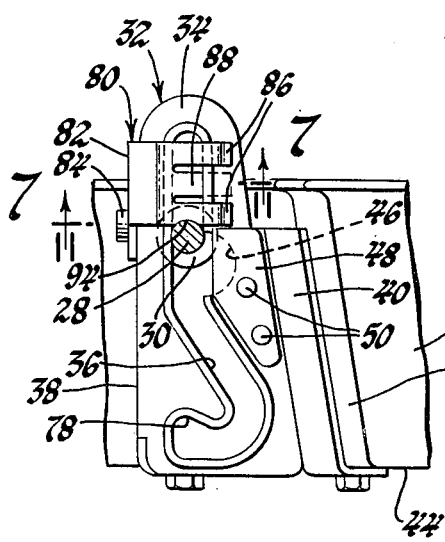
FIG. 6 is a view similar to FIGS. 4 and 5 showing applied brackets partially covering the slots and engageable by the pivots to space the support an intermediate distance below the vehicle to house an intermediate thickness spare wheel.

If an intermediate size spare wheel is to be stored, a bracket 80 is applied to each of the brackets 36 as shown in FIGS. 6 and 7. The bracket 80 includes an angular flange 82 which is bolted at 84 to flange 38. A bifurcated portion of the bracket 80 includes outer fingers 86 and an inner finger 88. The outer fingers 86 span the slot 36 and have offset ends 90 which rest on the outer surface of wall 34. The inner finger 88 spans the slot and has an offset end 92 which rests on the inner surface of wall 34. Bracket 80 effectively shortens the longer leg of the slot 36. As shown in FIG. 6, an arcuate cut-out 94 is provided in one side of the bracket 80 to provide a bearing for the pivots 28. Additional size members 80 can also be used if necessary for additional thickness spare wheels.

Thus this invention provides an improved spare wheel carrier which is adjustable to store and house various thickness spare wheels.

The embodiments of the invention in which an exclusive property or privilege is claimed are defined as follows:

1. A spare wheel carrier for stowing spare wheels of different thickness generally horizontally under a vehicle comprising, in combination,
   a support member receiving the spare wheel,
   spaced pivots depending from the vehicle and defining an axis of rotation adjacent one end of the support member,
   spaced bracket means on the support member adjacent the one end thereof, each including a slot having upper and lower ends alternately engageable by a respective pivot to mount the support member to the floor member for pivotal movement between an upper generally horizontal position and a pivoted lower position wherein the support member and tire are located angularly to the horizontal,
   the engagement of the pivots with the upper ends of the slots spacing the support member in a first position a sufficient distance from the floor member to house a maximum thickness spare wheel, and the engagement of the pivots with the lower ends of the slots spacing the support member in a second position a lesser distance from the floor member sufficient to house a lesser thickness spare wheel, and cooperating means between the vehicle and the other end of the support member for locating such other end relative to the one end to maintain the support member generally horizontal in each upper position thereof.

2. A spare time carrier for stowing tires of different diameter and thickness generally horizontally under a floor member of a vehicle comprising, in combination, a generally planar spare tire support member of a size to receive the largest diameter spare tire, spaced pivots depending from the vehicle floor member and defining an axis of rotation adjacent one end of the support member, spaced bracket means on the support member adjacent the one end thereof, each including a vertically extending generally L-shaped slot, the ends of each leg thereof being alternately engageable by a respective pivot to mount the support member to the floor member for pivotal movement between upper generally horizontal positions and a pivoted lower position wherein the support member and tire are located angularly to the horizontal, the engagement of the pivots with the ends of the one respective legs of the slots spacing the tire support member in a first upper vertical position a sufficient distance from the floor member to house the largest thickness spare tire and the engagement of the pivots with the ends of the other respective legs of the slots spacing the support member in a second upper vertical position a lesser distance from the floor member sufficient to house a lesser thickness spare tire, means engageable with the spare tire to clamp the spare tire to the support member, and cooperating means between the vehicle and the other end of the tire support member for locating such other end in an upper vertical position corresponding to the upper vertical position of the one end to maintain the tire support member generally horizontal.

* * * * *